F. A. REICHENBACH.
TRACTOR.
APPLICATION FILED DEC. 4, 1917.

1,288,679.

Patented Dec. 24, 1918.
2 SHEETS—SHEET 1.

Witness
E. H. Buchanan

Inventor
Frank A. Reichenbach

By Orwig & Bair Attys

F. A. REICHENBACH.
TRACTOR.
APPLICATION FILED DEC. 4, 1917.
1,288,679.
Patented Dec. 24, 1918.
2 SHEETS—SHEET 2.
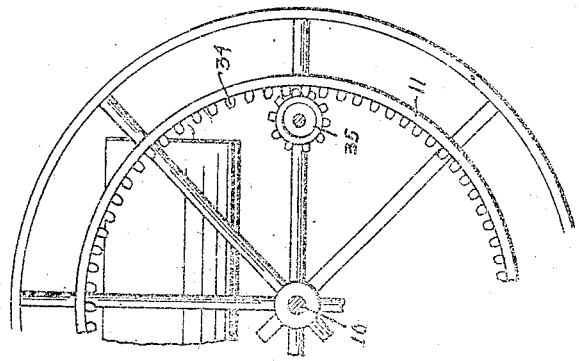
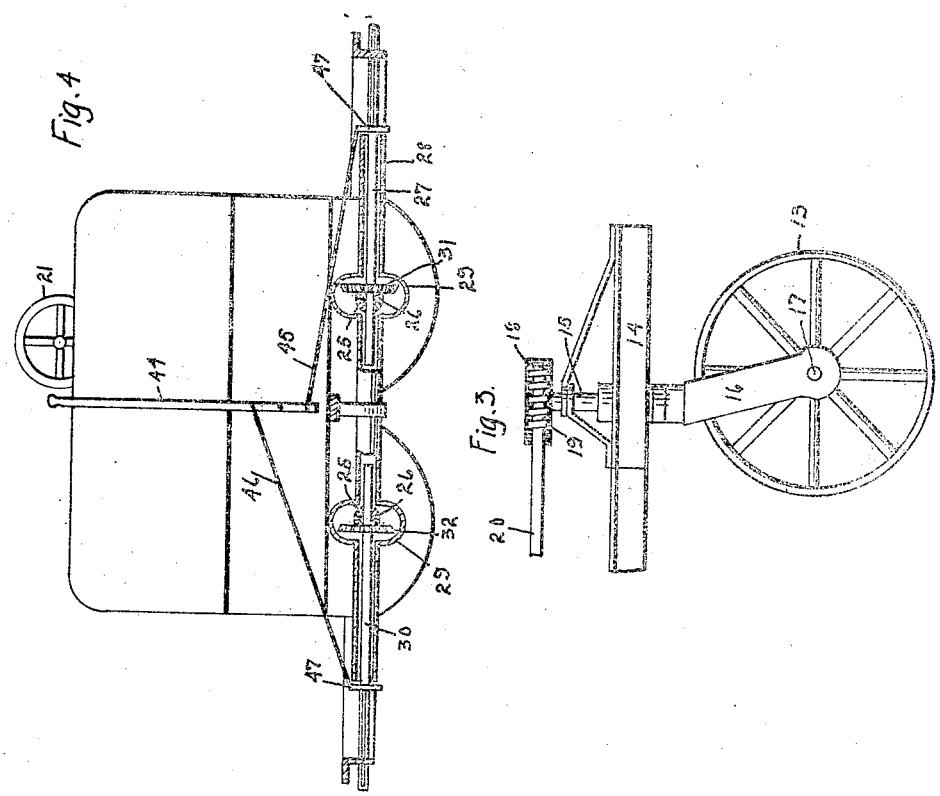
Witness
E. H. Buchanan
Inventor
Frank A. Reichenbach
By Orwig & Bair Attys

UNITED STATES PATENT OFFICE.

FRANK ALCIDE REICHENBACH, OF BOONE, IOWA.

TRACTOR.

1,288,679.  Specification of Letters Patent.  Patented Dec. 24, 1918.

Application filed December 4, 1917. Serial No. 205,467.

*To all whom it may concern:*

Be it known that I, FRANK ALCIDE REICHENBACH, a citizen of the United States, and resident of Boone, in the county of Boone and State of Iowa, have invented a certain new and useful Tractor, of which the following is a specification.

The object of my invention is to provide a tractor of durable construction having a plurality of engines with gearing devices connecting the engines with the tractor wheels in such manner that all the power of the engines may be applied to the tractor wheels or only one engine can be used for running the tractor.

Still a further object is to provide such an engine having a countershaft with a gearing device thereon for running additional mechanism, with suitable gearing devices for connecting one or more of the engines with the countershaft.

With these and other objects my invention consists in the construction, arrangement and combination of the various parts of the device, whereby the objects contemplated are attained, as hereinafter more fully set forth, pointed out in my claims and illustrated in the accompanying drawings, in which:

Fig. 2 shows a detail, sectional view taken on the line 2—2 of Fig. 1.

Fig. 3 shows a side elevation of the front part of the machine; and

Fig. 4 shows a detail view partly in section of the power shafts and gearing devices thereon.

Figure 1:
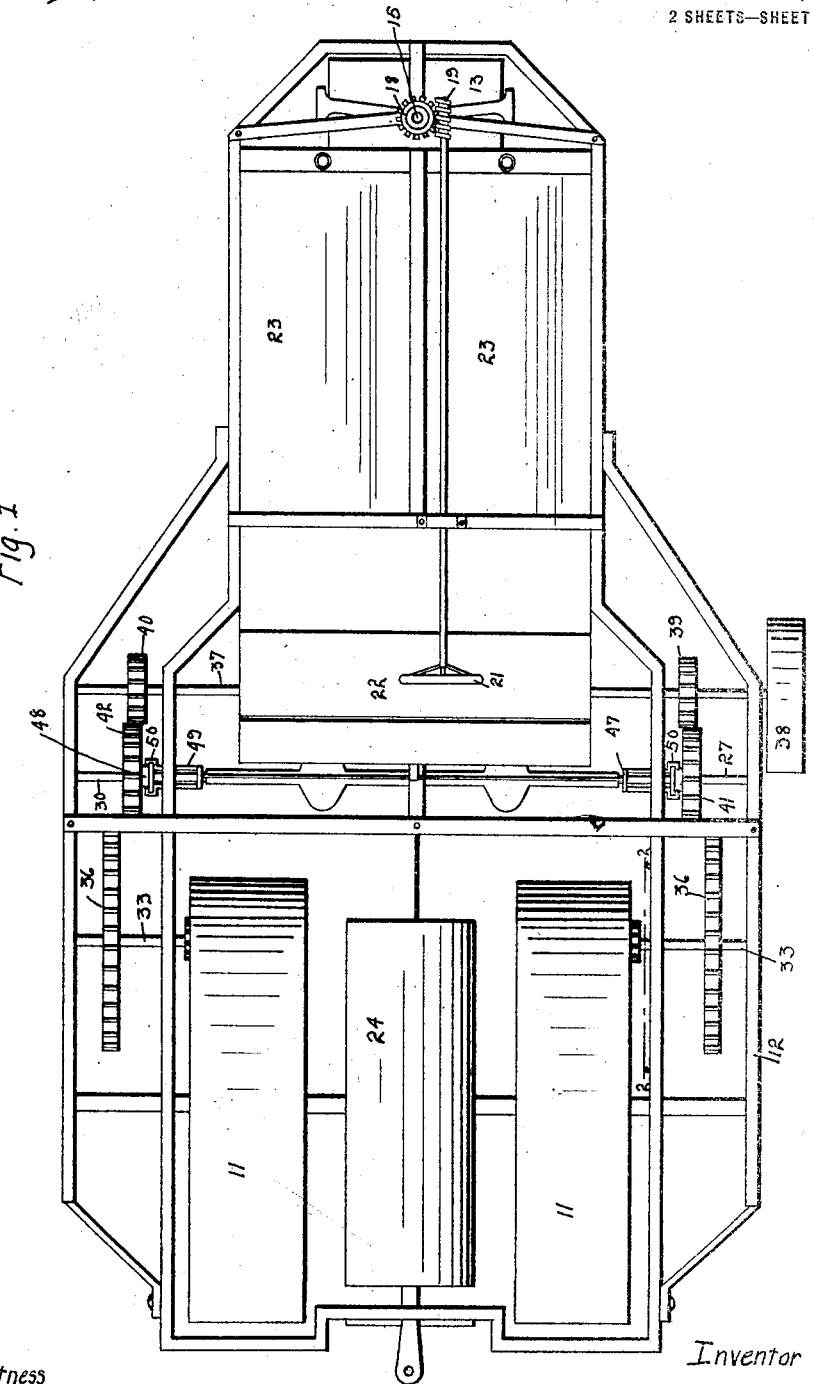
Figure 1 shows a plan view of a tractor embodying my invention.

In the accompanying drawings, I have shown a form of my invention and have used the reference numeral 10 to indicate generally the axle, supporting a pair of spaced vertical wheels 11.

I preferably use, in the form of the invention shown herein, a single front wheel 13 supported on the frame 14 as a caster wheel, and having the upwardly extending shaft 15 mounted in suitable bearings on the frame and connected with the yoke 16 in which the spindle 17, that supports the caster wheel 13, is mounted.

On the upper end of the shaft 15 is a worm wheel 18 which meshes with a worm gear 19 on a steering rod 20 which extends rearwardly in the machine, and has at its rear end a steering wheel 21 adjacent to a seat 22.

Supported at the forward part of the machine are two engines 23. Supported on the rear part of the machine preferably between the traction wheels 10 is a fuel tank 24.

Extending rearwardly from each engine is an engine shaft 25 on the rear end of which is mounted a beveled gear 26.

Arranged transversely of the machine are alined shafts 27 and 30 mounted in a sleeve 28 which is provided with gear casings 29.

On the shafts 27 and 30 are beveled gears 31 and 32, respectively, which mesh with the respective gears 26 on the engine shafts.

Suitably mounted on the frame are alined stub shafts 33. The traction wheels 11 are provided with internal gears 34 which mesh with gears 35 on the inner ends of the respective stub shafts 33, as illustrated in Figs. 1 and 2.

On the shafts 33 are larger gears 36, shown in Fig. 1.

Suitably mounted on the frame of the machine forwardly of the members 27 is a countershaft 37, one end of which has a belt pulley or other suitable gearing device 38, whereby other machinery may be operatively connected with my improved tractor.

On the shaft 37 are spaced gears 39 and 40. On the shafts 27 and 30 are gears 41 and 42 slidably but non-rotatably mounted and adapted in different positions to mesh with the respective gears 39 and 40, or with the gears 36.

For simultaneously sliding the gears 41 and 42 on the shafts 27 and 30 I have provided the following mechanism.

Suitably mounted on the frame and pivoted at a point above its lower end is a suitable upright lever 44. Pivoted to the lever 44 at points equi-distant above and below its pivot point on the machine are links 45 and 46. The links 45 and 46 extend in opposite directions in the machine and are pivoted to collars 47. The gears 41 and 42 are formed with grooved hubs 48.

Extending from the collars 47 are pairs of opposite arms 49 having at their ends yokes 50 which rotatably receive the flanges on the respective hubs 48. It will thus be seen that by swinging the lever 44 to different positions the gears 41 and 42 may be slid on the shafts 27 and 30 to position to mesh simultaneously with the gears 39 and 40 or to positions to mesh simultaneously with the gears 36.

In the practical operation of my improved tractor, where it is to be used as a self-propelling vehicle, the lever 44 is operated to move the gears 41 and 42 into mesh with the gears 36.

In pulling a heavy load both of the engines 23 are employed. It will be seen that by using two engines the necessity for using a differential is dispensed with.

The engine carrying the heavy load will be pulled down until the engines run at substantially the same speed. The machine can be steered from the seat by means of the steering wheel 21. Where only a light load is drawn only one engine need be operated and the machine can be run from one tractor wheel, and on account of the front steering wheel can be steered in any direction.

When it is desired to use the machine in connection with other machinery such other machinery is connected with the gearing device 38 and the lever 44 is operated so that the gears 41 and 42 will mesh with the gears 39 and 40, as illustrated in Fig. 1, whereupon the shaft 37 will be operated from the engine for running such other machinery.

It will be obvious that either one or both of the engines may be used for operating the shaft 37.

The advantages of a simple gearing connection such as is here shown will be obviously seen from the foregoing description. Only the simplest type of gearing device may be employed. The ordinary differential gear may be entirely dispensed with.

Any ordinary multiple speed gearing may be used in connection with the engine shaft if desired.

The machine may be run as a tractor or may be employed for running other machinery and in either case either one or both of the engines may be employed.

I have thus produced a machine which, under some circumstances can exercise a maximum of power and under other circumstances a minimum of power and which does not use a fuel or energy when the minimum of power is being employed.

It is obvious that a machine of this type has a wide range of pulling capacity with a minimum of fuel consumption and of wear on the parts and of engine use.

Such a machine can be put to a great variety of uses both in hauling and in operating other machinery.

Some changes may be made in the construction and arrangement of the various parts of the device whereby without departing from the purpose and features of my invention, and it is my intention to cover by my invention, any modified forms of structure or use of mechanical equivalents which may be reasonably included within the scope of my claims.

I claim as my invention:

1. A tractor comprising a frame, an axle supported thereon, traction wheels on said axle, a steering wheel, a steering gear connected with said steering wheel, a pair of engines, alined power shafts operatively connected with the respective engines, gearing devices for connecting said power shafts with the respective traction wheels, a counter-shaft, said last described gearing devices being adjustable for selectively connecting them with the counter-shaft or with the traction wheels.

2. A tractor comprising a frame, an axle supported thereon, traction wheels on said axle, a steering wheel, a steering gear connected with said steering wheel, a pair of engines, alined power shafts operatively connected with the respective engines, alined stub shafts, gearing devices for connecting said stub shafts with the respective traction wheels, gears on said stub shafts, gears on said power shafts, slidably but non-rotatably mounted, a lever, and means for operatively connecting said lever with said gears on the power shafts for simultaneously sliding them, whereby in one position of their movement they may be made to mesh with the gears on said stub shafts.

3. A tractor comprising a frame, an axle supported thereon, traction wheels on said axle, a steering wheel, a steering gear connected with said steering wheel, a pair of engines, alined power shafts operatively connected with the respective engines, alined stub shafts, gearing devices for connecting said stub shafts with the respective traction wheels, gears on said stub shafts, gears on said power shafts, slidably but non-rotatably mounted, a counter-shaft, gears on said countershaft, a lever, and means for operatively connecting said lever with the gears on the power shafts whereby said last named gears may be simultaneously moved to position for meshing with the respective gears on the stub shafts, or to position for meshing with the gears on the counter-shaft.

Des Moines, Iowa, November 23, 1917.

FRANK ALCIDE REICHENBACH.